(12) United States Patent
Neher

(10) Patent No.: US 6,362,778 B2
(45) Date of Patent: Mar. 26, 2002

(54) PERSONAL LOCATION DETECTION SYSTEM

(76) Inventor: Timothy J Neher, 411 Hobron La., No. 3204, Honolulu, HI (US) 96815

( * ) Notice: Subject to any disclaimer, the term of this patent is extended or adjusted under 35 U.S.C. 154(b) by 0 days.

(21) Appl. No.: 09/803,799

(22) Filed: Mar. 9, 2001

Related U.S. Application Data

(63) Continuation-in-part of application No. 09/536,009, filed on Mar. 26, 2000.

(51) Int. Cl.[7] ............................ G01S 5/02; H04B 7/185; H04Q 7/20

(52) U.S. Cl. ................................. 342/357.07; 455/456

(58) Field of Search ....................... 342/357.07, 357.09, 342/357.1; 375/373–377; 455/456, 457

Primary Examiner—Thomas H. Tarcza
Assistant Examiner—Fred H Mull
(74) Attorney, Agent, or Firm—Michael I. Kroll

(57) ABSTRACT

A personal locator system for determining the location of a locator unit. The system includes a locator device in communication with both a central station and a GPS satellite. The locator unit includes a portable housing able to be worn about the wrist of a user. A communication system is positioned within the housing for contacting the central station and includes a transmitter and receiver. A GPS unit is also positioned within the housing for contacting the GPS system for determining a location of said locator device. Upon receipt of a location request signal by the receiver from the central station, the locator unit activates the GPS unit to contact the GPS system and receive location data therefrom. Upon receipt of the location data, the transmitter transmits the location data to the central station for analysis. A panic button is provided for transmitting an emergency signal to the central station and initiating detecting the location of the locator unit. A non-emergency call button is provided for transmitting a location request signal to the central station and in response thereto, informing a person on the contact list as to the location of the locator device. The communication system utilizes one of a POTS, cellular, PCS or internet communications network. A tamper detection sensor detects when said device is tampered with. A beacon generator generates an ultrasonic or radio frequency beacon signal for aiding a person in pinpointing a location of the device.

8 Claims, 6 Drawing Sheets

PERSONAL LOCATION DETECTION SYSTEM

REFERENCE TO RELATED APPLICATIONS

This application is a Continuation-in-Part Application of U.S. patent application Ser. No. 09/536,009 having a filing date of Mar. 26, 2000.

BACKGROUND OF THE INVENTION

1. Field of the Invention

The present invention relates generally to location systems and, more specifically, to a system able to locate and track a user retaining a portable locator unit using numerous location technologies including the Global Positioning Satellite (GPS) System and the generation of a beacon for use in pinpointing the location of the locator unit and thus the user.

2. Description of the Prior Art

Numerous types of location systems have been provided in the prior art. For example, U.S. Pat. Nos. 5,043,736; 5,485,163; 6,014,080; 5,014,040; 5,841,396; 6,064,336; 4,275,398; 4,673,936; 5,731,757; 6,014,080; 6,076,099; 6,100,806; 6,104,931; 6,111,538; 6,111,539; 6,140,956; 6,169,497; 6,172,640 and 5,874,914 all are illustrative of such prior art. While these units may be suitable for the particular purpose to which they address, they would not be suitable for the purposes of the present invention as heretofore described.

U.S. Pat. No. 5,043,736

Inventor: Ralph D. Darnell, et al.

Issued: Aug. 27, 1991

The invention comprises a portable locator unit useful both as a cellular telephone and portable global positioning system that provides latitude and longitude information remotely to a base unit display. The system includes a small hand held receiver that receives signals from a satellite global positioning system and timing and computing circuits to provide location information signals. The hand held unit also includes a modem and transmitter to a cellular telephone network which is connected to the base unit computational system and display. The location of an individual or object can thus be determined at the remote station through the use of the cellular telephone network.

U.S. Pat. No. 5,485,163

Inventor: Martin H. Singer et al.

Issued Jan. 16, 1996

A system and method for locating a portable locator device in a communications network. The portable locator unit (PLU) (4) is activated either by an external signal (62) generated in response to remote activation source, such as a subscriber (6, 8) or PLU detector (106, 108), or by an internal activation signal triggered e.g. by the wearer. Once activated, the PLU (4) transmit a location signal (66). This location signal (66) is received by one or more network service nodes (20, 22, 24) which forward the information along with identifying service node information to a network location processor (26, 28). After having determined the location of the PLU (4) from the received information, the network location processor (26, 28) forwards this information to a designated source, such as the requested subscriber or other authorized user (6, 8).

U.S. Pat. No. 6,014,080

Inventor: Hoyt M. Layson, Jr.

Issued: Jul. 11, 2000

Tamper resistant body-worn tracking device to be worn by offenders or potential victims for use in a wireless communication system receiving signals from a global positioning system (GPS). The tracking device directly communicates spacial coordinates to multiple remote sites. The tracking device is an enclosed case worn on a limb of a person. The case contains a battery, a signalling device, and a circuit board containing a field programmable gate array, a wireless data modem, a conventional GPS receiver, and a matching filtering GPS receiver.

U.S. Pat. No. 5,014,040

Inventor: Philip W. Weaver et al.

Issued: May 7, 1991

A personal locator transmitter adapted to be worn on the wrist and having the size and appearance of a conventional wrist-watch. This transmitter is provided with a programmable memory, a transmitter controlled by the memory, an antenna for reliably radiating signals from the transmitter regardless of orientation of the wrist of a user and including both a manually operable alarm activated by pressing a button, and an automatic alarm actuated by an attempt to remove the unit from the wrist of the wearer. The unit is controlled by a control memory comprised of an EPROM encoded with unique identification codes and other information as required in the specific application.

U.S. Pat. No. 5,841,396

Inventor: Norman F. Krasner

Issued: Nov. 24, 1998

A precision carrier frequency signal for calibrating a local oscillator of a GPS receiver which is used to acquire GPS signals. The precision carrier frequency signal is used to calibrate the local oscillator such that the output of the local oscillator, which is used to acquire GPS signals, is modified by a reference signal generated from the precision carrier frequency signal. The GPS receiver locks to this precision carrier frequency signal and generates the reference signal. In another aspect of the invention, satellite almanac data is transmitted to a remote GPS receiver unit from a basestation via a communication link. The remote GPS receiver unit uses this satellite almanac data to determine approximate Doppler data for satellites in view of the remote GPS receiver unit.

U.S. Pat. No. 6,064,336

Inventor: Norman F. Krasner

Issued: May 16, 2000

A precision carrier frequency signal for calibrating a local oscillator of a GPS receiver which is used to acquire GPS signals. The precision carrier frequency signal is used to calibrate the local oscillator such that the output of the local oscillator, which is used to acquire GPS signals, is modified by a reference signal generated from the precision carrier frequency signal. The GPS receiver locks to this precision carrier frequency signal and generates the reference signal. In another aspect of the invention, satellite almanac data is transmitted to a remote GPS receiver unit from a basestation via a communication link. The remote GPS receiver unit uses this satellite almanac data to determine approximate Doppler data for satellite in view of the remote GPS receiver unit.

U.S. Pat. No. 4,275,398

Inventor: William H. Parker, et al.

Issued: Jun. 23, 1981

A radio locator system uses transceivers located in a mobile and at least two stationary stations. Each stationary station serves as one end of a surveyor's baseline. Therefore, since the transceivers are located at opposite ends of a line having a known length, their broadcast signals provide direct distance measurements of two other lines extending between the individual stationary stations and the mobile unit, thereby cooperating with the known line to complete a trilateralization. Each station in the system is identified by a uniquely encoded stream of pulse bursts, each burst encompassing a wide, preprogrammed change of frequency for eliminating interference between the signals used in the locator system and the signals of other users of the same frequency band. An inversion of the preprogrammed frequency change is used for the return of the ranging system signal in order to substantially eliminate or suppress echo returns to the mobile or interrogator station. The sound of the preprogrammed station identifying frequency changes is sometimes called "chirping".

U.S. Pat. No. 4,673,936

Inventor: Keigo Kotoh

Issued: Jun. 16, 1987

A small-sized transmitting apparatus for search and rescue operation (SARTR) adapted to be worn by a user for emitting a microwave rescue signal upon a marine accident involving the user. The SARTA includes a power supply, a transmitter unit energizable by the power supply and having a microwave oscillator, a transmitting antenna receiving of a microwave output from the transmitter unit for emitting the microwave rescue signal, a case accommodating the power supply, the transmitter unit, and the transmitting antenna and attachable directly to the user's body, or mountable on clothing or the like worn by the user for being carried thereby, and a switch unit mounted in the case for controlling the emission of the micromave rescue signal.

U.S. Pat. No. 5,731,757

Inventor: Hoyt M. Layson, Jr.

Issued: Mar. 24, 1998

A portable locator or tracking apparatus is provided for continuous location determination of subjects which communicates with a body-worn, non-removable, tamper resistant transceiver and a central data-base system. The portable tracking apparatus has a Global Position System (GPS) receiver and inertial sensors for determining location, microprocessors for logic and mathematical algorithm processing, memory for programs and data, a wireless transceiver for communications with the body-worn device, a wireless transceiver for communicating with the central data-base system, an alpha-numeric display for displaying text messages sent to the subject acoustic speaker and microphone for voice and tone messages with subjects, electronic tamper sensors, motion sensors, attitude position sensor, batteries and external connectors for power, recharge, communications and auxiliary antennas.

U.S. Pat. No. 6,014,080

Inventor: Hoyt M. Layson, Jr.

Issued: Jan. 11, 2000

Tamper resistant body-worn tracking device to be worn by offenders or potential victims for use in a wireless communication system receiving signals from a global positioning system (GPS). The tracking device directly communicates spacial coordinates to multiple remote sites. The tracking device is an enclosed case worn on a limb of a person. The case contains a battery, a signalling device, and a circuit board containing a field programmable gate array, a wireless data modem, a conventional GPS receiver, and a matching filtering GPS receiver.

U.S. Pat. No. 6,076,099

Inventor: Thomas C. H. Chen et al.

Issued: Jun. 13, 2000

A method for a configurable intelligent-agent-based wireless communication system that can be used for conducting acquisition, processing, monitoring, tracking and reporting of data at remote mobile units over a wireless communication network. The system is comprised of an intelligent-agent-based wireless communication controller (110), a wireless data transmitter/receiver (120), a global positioning system data receiver (130), a plurality of data storage devices (140), a plurality of serial ports (150), a display device (160), and a battery with power charging circuitry (170).

U.S. Pat. No. 6,100,806

Inventor: John J. Gaukel

Issued: Aug. 8, 2000

An apparatus and method of monitoring mobile objects or persons utilizes the Global Positioning System satelltes and cellular telephone communications. The apparatus may include first and second remote units adapted to be worn on the monitored person or object. These remote units would comprise the position and data sensors as well as the transmitter device to transmit the information back to a central tracking station. The remote units may be operative to monitor many data items such as system integrity, motion, temperature, audio, and the like in addition to position. This data would then be transmitted back to a central monitoring station operative to process and display the information. The system is also adapted to monitor persons in hazardous environments such as radioactivity or poisonous gases or even to monitor inanimate objects such as automobiles.

U.S. Pat. No. 6,104,931

Inventor: Theodore Havinis et al.

Issued: Aug. 15, 2000

A telecommunications system and method is disclosed for defining location services in a simplified manner based upon whether the positioning request is an interactive request or a batch mode request. In order to initiate a positioning request, a Location Application (LA) must first register with at least one Mobile Location Center (MLC), define the service parameters specific for that LA and receive a Location Application Identifier Number (LAIN). Thereafter, the LA can send either an interactive or batch mode positioning request along with the LAIN. An interactive positioning request is a request to position a specific subscriber or group of subscribers immediately, while a batch mode positioning request is a request to position a subscriber or group of subscribers when a particular event defined by the LA occurs. Advantageously, the definition of location services is decoupled from issues, such as the point of origin of the request, the identity of the subscriber to be positioned and authorization options.

U.S. Pat. No. 6,111,538

Inventor: Leonard Schuchman et al.

Issued: Aug. 29, 2000

Positioning system for locating a mobile body comprising a plurality of earth based spread spectrum (SS) broadcasting stations arranged geographically in a cellular pattern. Each SS broadcasting station include a modulator providing a channel signal structure which is substantially orthogonal with respect to adjacent stations in the cellular pattern, each channel signal including navigation beacon data including a unique beacon identification, station latitude and longitude, time slot and phase characterizations and selected parameters of adjacent stations. In one embodiment, each modulator provides a chirped SS signal in which the navigation beacon is a frequency tone that is repeatedly swept over a selected frequency band for each station. In a further embodiment, each modulator provides a GPS like direct sequence SS signal in which the navigation beacon is a PN coded broadcast. A receiver on the mobile body receives the SS signals from at least three of the SS broadcasting stations and determines the location thereof. A fourth SS broadcasting station provides altitude. Cellular Positioning System (CPS) satellite signals can be used for timing control.

U.S. Pat. No. 6,111,539

Inventor: Thomas Mannings et al.

Issued: Aug. 29, 2000

A navigation information system includes a communications system having a fixed part and at least one mobile part, the fixed part including data storage and processing for identifying the location of a mobile unit, generating guidance information appropriate to that location and transmitting it to the mobile unit. By locating most of the complexity with the service provider, in particular the navigation computer and geographical database, the system can be readily updated and the capital cost of the in-vehicle system, which in its simplest form may be a standard cellular telephone, can be minimized. The user makes a request for guidance information, and the system, having determined the user's present location, then transmits instructions to the user. The user's present location can be determined by a Satellite Positioning System.

U.S. Pat. No. 6,140,956

Inventor: Robert L. Hillman et al.

Issued: Oct. 1, 2000

A system which tracks and monitors a vehicle by utilizing cellular communication componentry and global positioning system componentry is disclosed. The system provides for simultaneous and continuous transmission of a voice signal and location data to a monitoring center. The monitoring center comprises componentry to communicate with the vehicle and determine the vehicle's location on a digitized map using a computer.

U.S. Pat. No. 6,169,497

Inventor: Bruno Robert

Issued: Jan. 2, 2001

A mobile tracking and positioning system includes a plurality of mobile transmit and receive stations that track a mobile target which emits a radio signal in response to the occurrence of a tracking effort initiation event. The tracking stations have a GPS receiver or like means for determining their position, a radio direction finder responsive to the radio signal that determines the vector of the mobile target, a two-way communications system and a computer. The mobile transmit and receive stations exchange their position and direction to target information via the two-way communications systems, enabling the stations to triangulate the location of the target with their computers.

U.S. Pat. No. 6,172,640

Inventor: Jennifer Durst et al.

Issued: Jan. 9, 2001

There is disclosed an object locator system (10) for requesting and obtaining information about the location of an individual animal or moveable object, having a lightweight, attached object locator (42), that is present in a region served by a two-way paging system (12) and a global positioning satellite system (50). The object locator (42) may be selectively activated to conserve power or enabled to respond only when beyond or within a boundary. Further, the object locator system (10) may provide the location information in several forms including rectangular or polar coordinates referred to a base station (18) or origin., position on a map display, etc.

U.S. Pat. No. 5,874,914

Inventor: Norman F. Krasner

Issued: Feb. 23, 1999

A GPS receiver in one embodiment includes an antenna which receives GPS signals at an RF frequency from in view satellites; a downconverter coupled to the antenna for reducing the RF frequency of the received GPS signals to an intermediate frequency (IF); a digitizer coupled to the downconverter and sampling the IF GPS signals at a predetermined rate to produce sampled IF GPS signals; a memory coupled to the digitizer storing the sampled IF GPS signals (a snapshot of GPS signals); and a digital signal processor (DSP) coupled to the memory and operating under stored instructions thereby performing Fast Fourier Transform (FFT) operations on the sampled IF GPS signals to provide pseudorange information. These operations typically also include preprocessing and post processing of the GPS signals. After a snapshot of data is taken, the receiver front end is powered down. The GPS receiver in one embodiment also includes other power management features and includes, in another embodiment the capability to correct for errors in its local oscillator which is used to sample the GPS signals. The calculation speed of pseudoranges, and sensitivity of operation, is enhanced by the transmission of the Doppler frequency shifts of in view satellites to the receiver from an external source, such as a basestation in one embodiment of the invention.

SUMMARY OF THE PRESENT INVENTION

The present invention relates generally to location systems and, more specifically, to a system able to locate and track a user retaining a portable locator unit using numerous location technologies including the Global Positioning Satellite (GPS) System and the generation of a beacon for use in pinpointing the location of the locator unit and thus the user.

A primary object of the present invention is to provide a personal location detection system that will overcome the shortcomings of prior art devices.

Another object of the present invention is to provide a personal location detection system which is able to track a missing person in both hostile and non-hostile situations.

A further object of the present invention is to provide a personal location detection system which is able to u se the Global Positioning Satellite (GPS) system to determine the location of a user in a secure power efficient manner.

A yet further object of the present invention is to provide a personal location detection system wherein the user retains a portable locator device which includes means for wirelessly connecting to both a communications network and the GPS and relaying the location determined by the GPS to a central station via the communications network.

A still further object of the present invention is to provide a personal location detection system wherein the portable locator unit is able to generate a sonic or radio frequency beacon for aiding emergency personnel in pin pointing the location of the user.

An even further object of the present invention is to provide a personal location detection system wherein the user is able to initiate an emergency call to the central station using the personal locator unit, whereby, in response to the call, the central station will contact a designated person as to the location and situation regarding the user.

A yet further object of the present invention is to provide a personal location detection system wherein the user is also able to initiate a non-emergency call to the central station, causing the central station to contact a designated person.

Another object of the present invention is to provide a personal location detection system wherein the user is able to initiate a voice call to another party via the central station using the locator unit without dialing phone numbers.

A still further object of the present invention is to provide a personal location detection system that is simple and easy to use.

An even further object of the present invention is to provide a personal location detection system that is economical in cost to manufacture.

Additional objects of the present invention will appear as the description proceeds.

A personal locator system for determining the location of a locator unit is disclosed by the present invention. The system includes a locator device in communication with both a central station and a GPS satellite. The locator unit includes a portable housing able to be worn about the wrist of a user. A communication system is positioned within the housing for contacting the central station and includes a transmitter and receiver. A GPS unit is also positioned within the housing for contacting the GPS system for determining a location of said locator device. Upon receipt of a location request signal by the receiver from the central station, the locator unit activates the GPS unit to contact the GPS system and computes location data therefrom. Upon completing calculation of the location data, the locator transmits the location data to the central station for analysis. A panic button is provided for transmitting an emergency signal to the central station and initiating detecting the location of the locator unit. A non-emergency call button is provided for transmitting a location request signal to the central station and in response thereto, informing a person on the contact list as to the location of the locator device. The communication system utilizes one of a POTS, cellular, PCS or internet communications network. A tamper detection sensor detects when said device is tampered with. A beacon generator generates an ultrasonic or radio frequency beacon signal for aiding a person in pinpointing a location of the device.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
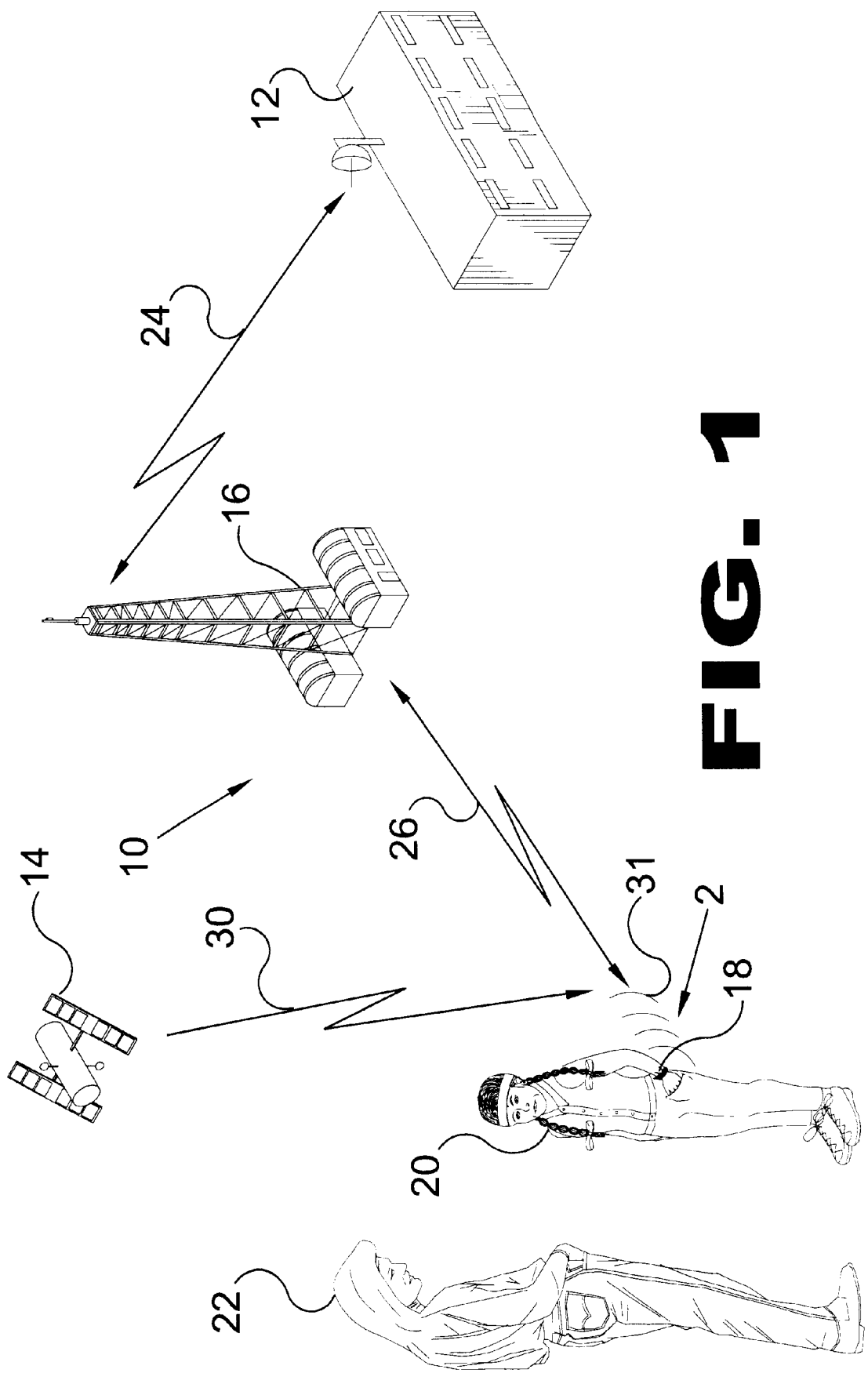
FIG. 1 is a top perspective view of the personal location detection system of the present invention being used to monitor the location of a child.

Turning now descriptively to the drawings, in which similar reference characters denote similar elements throughout the several views, the Figures illustrate the personal location detection system of the present invention. With regard to the reference numerals used, the following numbering is used throughout the various drawing figures.

10 global positioning and tracking system of the present invention
12 central monitoring station
14 tracking satellite
16 local transmitter/receiver station 18 portable locator unit
20 child wearing tracking device
22 guardian of child
24 line indicating transmission between central station and relay station
25 reference GPS receiver station
26 line indicating transmission between relay station and locator unit
30 line indicating transmission of location signal from satellite to locator unit
32 wrist of user wearing portable locator unit
34 smooth outer surface of portable locator unit
36 display
38 face side of portable locator unit
40 clock
42 emergency panic button
44 non-emergency location button
46 air mode button
48 latching mechanism
50 lock/unlock button
51 Key Fob port
52 headphone port
54 processor
56 power source
58 power sensor
60 memory
62 receiver
64 transmitter
66 microphone
68 speaker
70 GPS transmitter/receiver
72 beacon
74 key fob
76 tamper sensor
78 subscriber
80 PSTN/Cellular communications link
82 Internet connection
84 public service telephone network
86 PCS tower

DETAILED DESCRIPTION OF THE PREFERRED EMBODIMENT

Turning now descriptively to the drawings, in which similar reference characters denote similar elements throughout the several views, FIGS. 1 through 6 illustrate the global positioning and tracking system of the present invention indicated generally by the numeral 10.

The global positioning and tracking system 10 is illustrated in FIG. 1 and includes a central monitoring station 12, a tracking satellite 14, a local relay station 16 and a portable locator unit 18. The central monitoring station 12 is able to monitor movements of an activated portable locator unit 18 upon either contacting the portable locator unit 18 or upon receipt of a signal generated by the portable locator unit 18.

The portable locator unit 18 is a tamper resistant and detectable portable unit which is releasably attached to an item of personal property or to an individual such as a child 20 as illustrated in FIG. 1. The child 20 in the figure is being watched by a guardian 22. The central monitoring station 12 communicates with the portable locator unit 18 via a public communications network such as Plain Old Telephone System (POTS), cellular, PCS or the internet. The main purpose of the system 10 is to locate the wearer using progressively more accurate technology methods for locating a person 20 carrying the portable locator unit 18. These technologies range from wireless Base Station ID location technology which can locate the locator unit 18 to a position within an area of between 1–10 square miles to the Global Positioning Satellite (GPS) system using wireless Internet as the communications medium which can locate wearers of the portable locator unit 18 to within approximately 5 meters. A sonic or radio frequency beacon generated by the portable locator unit 18 facilitates a final approach to a desired person or object.

Figure 2:
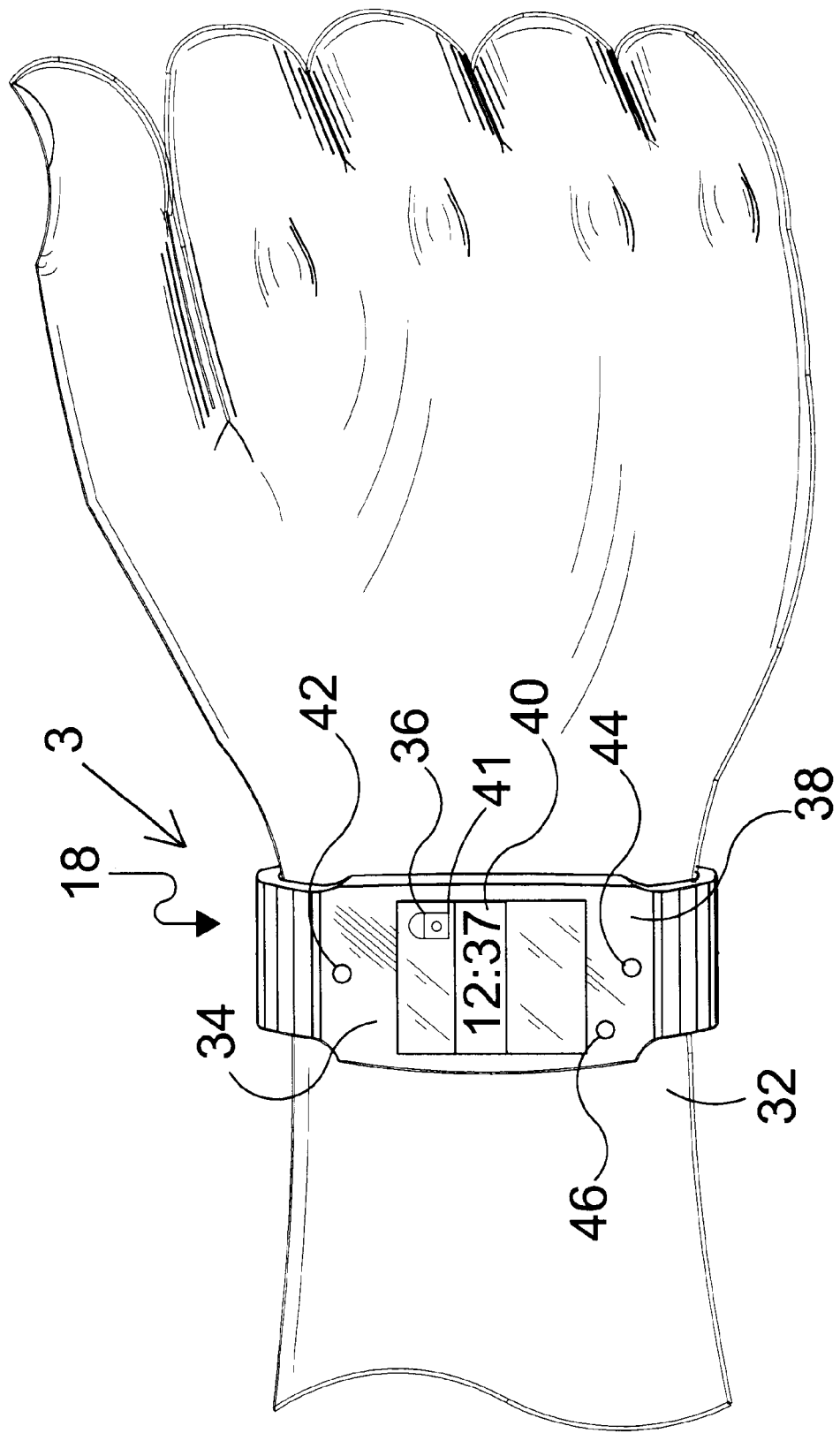
FIG. 2 is a front perspective view of the portable locator unit of the personal location detection system of the present invention being worn on the wrist of a user.

The system 10 of the present invention includes a client-server protocol such as SMS/QNC sessions in order to provide efficient location services including a paging function. An emergency call can be placed to the central station 12 by a person wearing the portable locator unit 18 by pressing a panic button 42 as seen in FIG. 2. A tamper detection sensor can automatically initiate an emergency call as well upon detection of tampering with the portable locator unit 18 as will be discussed hereinafter. A non-emergency call can also be initiated by the wearer upon activation of the non-emergency call button 44 as seen in FIG. 2. In this instant, the central station 12 informs a designated guardian on contact list as to the whereabouts of the user. A bread crumbling mode of operation allows for efficient and flexible tracking of the locator unit 18 given a limited battery power. The locking and unlocking mechanism and suspending of the locator unit operation (for example, for airplane traveling) is controlled by an authorized Key fob or by the central station 12 via a wireless network providing maximum security and usability. The operation of the system to perform these tasks will be described hereinafter.

In the normal mode of operation, a GPS unit of the portable locator unit 18 for communicating with the GPS satellite 14 is normally turned off and the system for communicating with the central station 12 is placed in a listening mode similar to that of cellular/PCS phone systems. When the central station 12 receives a call from a client requesting a location on a particular portable locator unit 18, the central station 12 initiates a communication with the portable locator unit 18. The central station 12 contacts the portable locator unit 18 using a wireless communication channel via local transmission/receiving stations 16 which relay the signal to the portable locator unit 18. The signal transmitted by the central station 12 to the local transmission/receiving stations 16 is indicated by the arrow labeled with the numeral 24. The signal transmitted by the local transmission/receiving stations 16 to the portable locator unit 18 is indicated by the numeral 26. Through this communications channel, the central station 12 provides instructions on how to report the location information back to the central station 12. The instructions received from the central station 12 could include aiding information for use by the GPS unit to obtain location information more quickly. Upon receipt of the instructions from the central station 12, the tracking device 18 ends the communication with the central station 12 and turns on the GPS unit therein. The GPS unit computes location data with or without aiding information (such as time, frequency and ephemeris) from the central station 12. At this time the portable locator unit 18 establishes a wireless communications link with the central station 12 and provides the location information thereto as is indicated by the arrows labeled with the numerals 26 and 24. The portable locator unit 18 also generates a beacon indicated by the arced lines labeled with the numeral 31. The beacon is a sonic or radio frequency signal which aids in locating the user when at close range.

Figure 3:
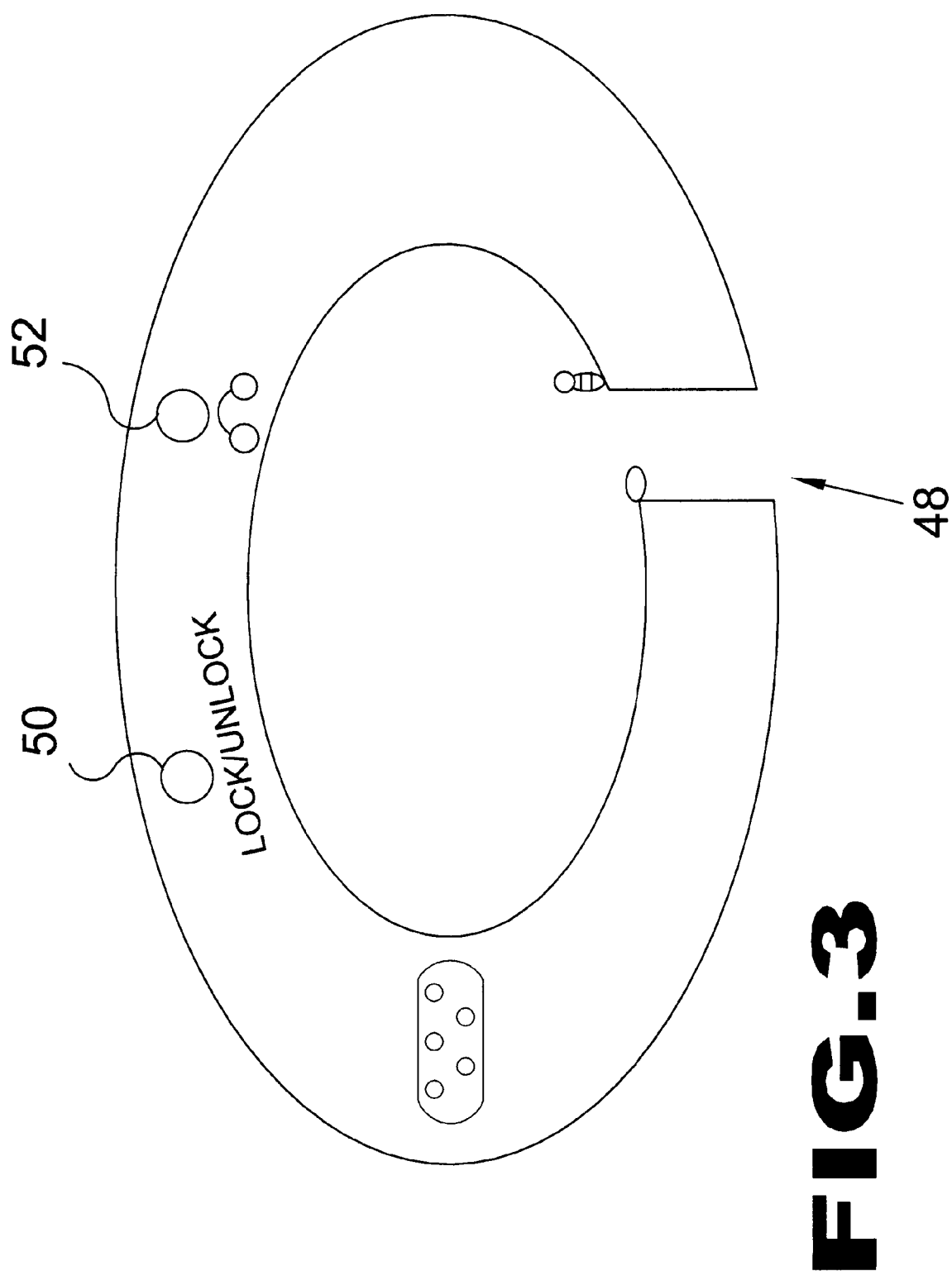
FIG. 3 is a side perspective view of the portable locator unit of the personal location detection system of the present invention.

An exemplary embodiment of a portable locator unit 18 is illustrated in FIGS. 2 and 3. The portable locator unit 18 is typically worn by the user around the wrist 32 similarly to a bracelet or watch. The portable locator unit 18 is preferably made of an uncuttable material so that it is difficult or even impossible to remove without the proper unlocking mechanism. Thus, the portable locator unit 18 can be used without worry for tracking the location of a child, a prisoner or inmate out on a work release program or furlough, senior citizens in need of medical care, personal property or even athletes such as hikers or mountain climbers moving through dangerous areas. The portable locator unit 18 includes an outer surface 34 having a smooth texture and a display 36 on a face side 38 thereof. The display 36 includes a clock 40 thereon for indicating the time of day. The locator unit 18 has an internal clock that is displayed. This time is set when the PCS unit in the locator unit 18 registers with the PCS tower. The unit automatically displays the correct time in the area worn correcting for daylight savings time when required. The time is very accurate, possibly to within a second of world time, but not accurate enough for the GPS portion of the unit. Also positioned on the display 36 is indicia 41 indicating whether or not the portable locator unit 18 is in a locked state about the wrist 32 of the user. Additional indicia may be displayed for indicating the mode of operation of the locator unit 18, such as when the locator unit 18 is in air mode as will be discussed hereinafter. An emergency button 42 is provided on the portable locator unit 18. Activation of the emergency button 42 initiates a communication with the central station 12 whereby a signal indicating an emergency situation exists is transmitted by the portable locator unit 18. In response to the receipt of the emergency signal, the central station 12 initiates the process of locating the portable locator unit 18 and upon determining the location alerts the proper emergency personnel. A non-emergency location button 44 is also located on the face side 40 of the portable locator unit 18. Activation of the non-emergency location button 44 contacts the central station 12 for locating the portable locator unit 18. Upon locating the portable locator unit 18, the central station 12 contacts a predetermined party to inform them of the location of the portable locator unit 18. An air mode button 46 is also provided on the portable locator unit 18. The air mode button 46 turns off the tracking device 18 for a predetermined period of time. This mode is useful when entering areas where the use of cellular technology is prohibited, such as on an airplane.

A side view of the portable locator unit 18 is shown in FIG. 3. From this figure, the latching mechanism 48 is shown along with a lock button 50, a port 51 for Key Fob and a port 52 for receiving a headphone. The portable locator unit 18 is secured (locked) to the wearer by latching the latching mechanism 48 and connecting a Key Fob to lock the portable locator unit 18 by pressing the lock button 50 on the Key Fob. The portable locator unit 18 could also be locked by a command from the central station 12. The lock/unlock button on a Key Fob activates an electromechanical device by uploading one of 1E22 different key codes to the portable locator unit 18, instructing it to latch a dead bolt, which prevents the portable locator unit 18 from being unlatched and removed. Upon activating the lock through button 50 or the Key Fob, the lock icon 41 appears on the display 36. The data indicating the lock/unlock status is contained within a data package when the portable locator unit 18 is communicating with the central station 12. The portable locator unit 18 can also be attached (not locked) to the user by simply latching the latching mechanism 48 and omitting the locking procedure. Once the latch is locked, it can be unlocked only by an authorized Key Fob. When the portable locator unit 18 is unlocked, the lock icon disappears from the display 36 and the portable locator unit 18 is able to be unlatched and removed. In order to minimize battery consumption at the portable locator unit 18, the preferred embodiment utilizes an IS95B PCS for communications between the portable locator unit 18 and central station 12. An exemplary locking mechanism 48 is illustrated in FIG. 3. However, the locking mechanism 38 may be provided with a variety of possible locking mechanisms such as keys, combination locks, electronic locks, etc. as long as the locking mechanism 48 prevents the portable locator unit 18 from being detached from the item or person once attached.

Figure 4:
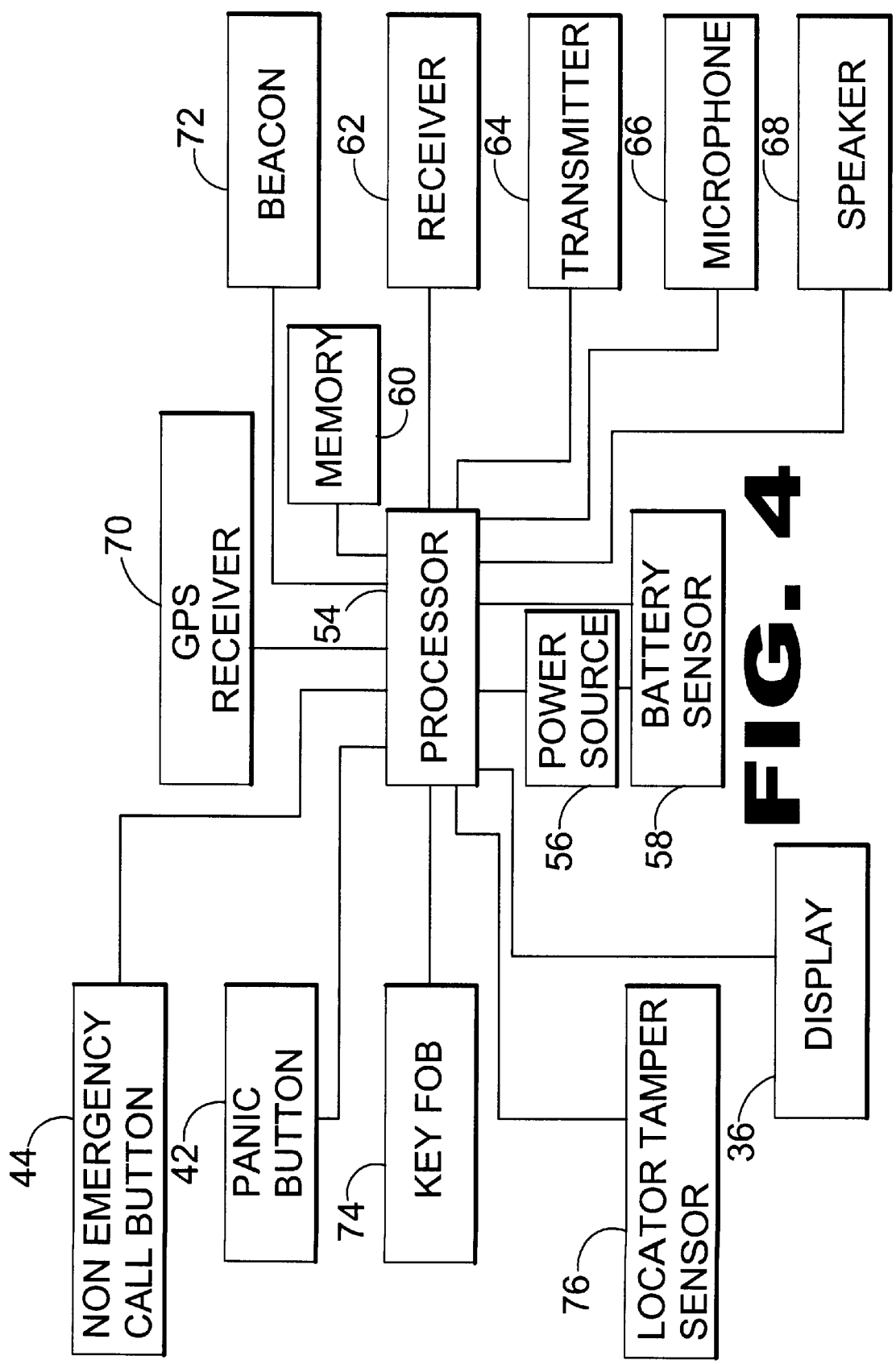
FIG. 4 is a block diagram showing the internal components of the portable locator unit of the personal location detection system of the present invention.

A block diagram illustrating the internal components of the locator unit 18 is shown in FIG. 4. Positioned within the locator unit 18 and controlling operation thereof is a processor 54. Connected to the processor 54 and providing power to the locator unit 18 is an internal power source 56. A battery sensor 58 is connected between the processor 54 and power source 56. The battery sensor 58 senses the power of the power source and provides a battery power signal to the processor 54. The processor 54 is thus able to determine when the power level is low and operate accordingly. A memory 60 is provided for storing data processed by the processor 54 and programs used by the processor 54 for operation of the locator unit 18. A receiver 62 is provided for receiving wirelessly transmitted signals from the central station 12 and a transmitter 64 transmits signals to the central station 12. Both the receiver 62 and transmitter 64 are connected to and controlled by the processor 54. A microphone 66 and speaker 68 are also provided for establishing a voice communication with another party through the central station 12. Alternatively, the microphone and speaker may be contained within a headset connected to the locator unit 18 through the headphone port 52. The microphone 66 is able to receive voice communication from the user and transmit an audio signal to the other party via the central station 12 using the transmitter. The receiver 62 is able to receive audio signals from the central station 12 for reproduction through the speaker 68.

A GPS receiver 70 is provided for contacting the GPS satellite 14 in order to determine a location of the locator unit 18. The location information is provided to the processor 54 and eventually to the central station 12. A beacon generating device 72 generates a sonic or radio frequency beacon for aiding in locating the user when at close range. The beacon generator 72 can be enabled for final approach to the wearer if a situation requires physical contact for rescue or any other reasons. In general, the GPS system does not have enough resolution to pinpoint a wearer within a building or visually obstructed area. The beacon 72 provides a means to achieve the final approach using a sonic or radio frequency device. A key fob 74 provides an additional means for securing the locator unit 18 about the wrist of the user. The Key Fob also provides a mechanism for charging a battery inside the locator unit 18. A tamper sensor 76 detects when the locator unit 18 has been tampered with or cut and signals the processor 54 of such. The processor 54 then generates an emergency signal which is transmitted to the central station 12. The central station 12 initiates a communication with the locator unit 18 for locating the locator unit 18. The panic button 42 and non-emergency call button 44 are connected to the processor 54 for initiating communication with the central station upon activation. The display 36 is also connected to the processor 54. The processor 54 controls the icons and the clock viewable on the display 36.

The operation of the personal location detection system 10 will now be described with reference to the figures and specifically FIGS. 5 and 6. In operation, the personal location detection system 10 is used to locate a person or object to which the locator unit 18 is secured. Shown in FIG. 6 is an example of PCS network based locator system 10. The locator unit 18 includes a GPS unit 70, a PCS communication system 62, 64, and a processor 54. The communication system 86 includes a processor therein for analyzing signals received by the receiver of the communication system 62, 64. A subscriber 78, typically a guardian in a missing child case, normally initiates a locate process through a regular phone (PSTN), a wireless telephone 80 or an internet connection 82. An operator in the central station 12 receives the request and initiates a call set up with the locator unit 18. The user 20 can also initiate a call set up by pressing either the panic button 42 or the non-emergency call button 44. In this instance, the locator unit 18 contacts the central station 12 and the system operates similarly to when a subscriber 78 contacts the central station 12.

The communication system 62, 64 constantly monitors the integrity of the system including but not limited to battery and tamper detector status. The communication system 62, 64 acts as a server to the control station 12 and sets up a communication link upon receipt of a request from the control station 12. The request from the control station 12 passes through the public service telephone network (PSTN) or cellular 80 and is received by the receiver of communications system 62, 64 of the locator unit 18 for analysis by the communications system 86. The locator unit 18 then responds to the request and transmits a response signal via the transmitter of the communication system 62, 64. In a preferred embodiment, a SMS Internet (TCP/IP) session is used for maximum interoperability. The communication system 62, 64 also acts as a client to the control station 12 when an event counter triggers the communication system 62, 64 and sets up a full duplex communication link. In a preferred embodiment of the invention, a TCP/IP based QNC session is employed for duplex communications between central station 12 and the locator unit 18. The communication system 62, 64 interfaces with the external device Key Fob 74 for secure lock/unlock and battery charging operations.

The GPS unit 70 performs the locating operation utilizing signals from the GPS satellites 14 in a view. Normally, the GPS unit 70 is in powered off mode, in response to a command from the central station 12 or upon activation of either the panic button 42 or non-emergency call button 44, the GPS unit 70 is turned on and starts the locating process upon activation by the processor 54. The GPS unit 70 can utilize aiding information from the central station 12 for improved performance. Such aiding information includes but is not limited to the approximate location of the locator unit 18, an almanac, ephemeris, a frequency offset, doppler, reference time, etc. The GPS unit 70 provides the location data computed using the GPS satellite 14 to the processor 54. The processor 54 initiates a call to the central station 12 and provides the location data to the central station 12 for analysis. The central station 12 is thus able to determine the location of the locator unit 18 to within a reasonable area. The processor 54 then activates the beacon generator 72, if necessary, to generate a sonic or radio frequency signal which a allows final approach to a desired object even within the area where the GPS or wireless communication link can not be established due to obtruded environment.

Figure 5:
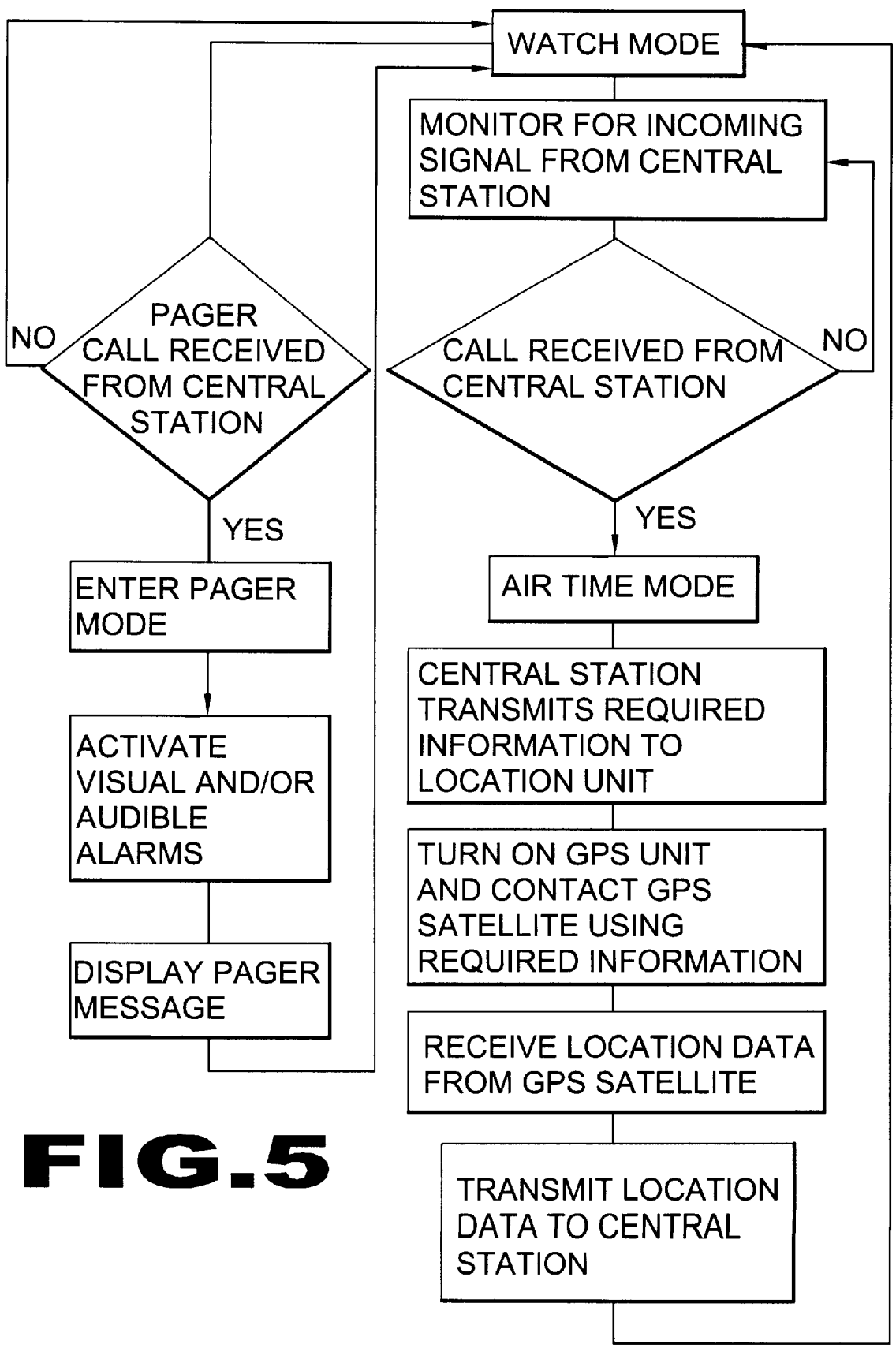
FIG. 5 is a flow diagram showing the flow between different operating modes of the personal location detection system of the present invention.
Figure 6:
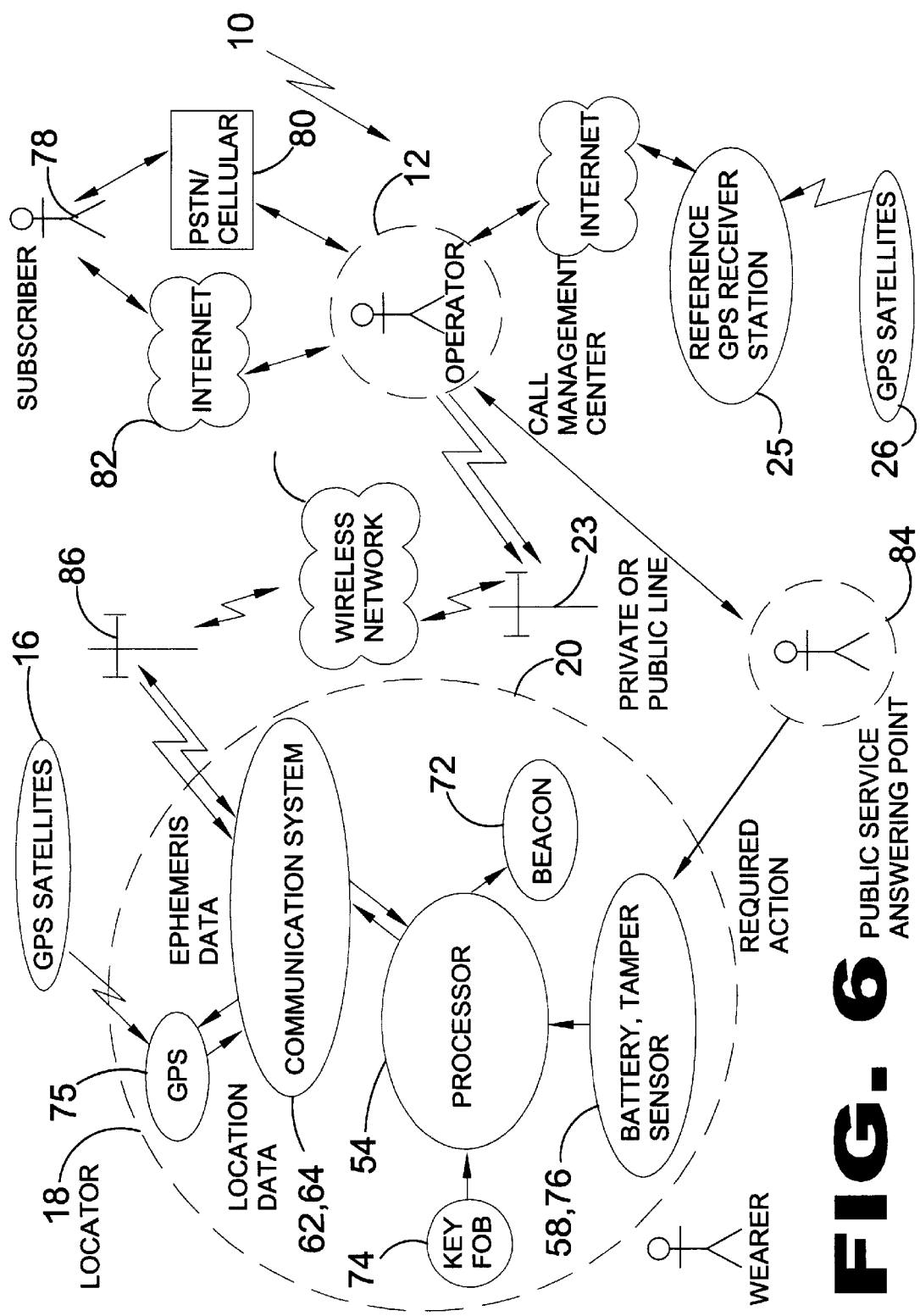
FIG. 6 is a perspective view of the personal location detection system of the present invention.

FIG. 5 illustrates a state diagrams showing different operating modes of the system for obtaining the location of the locator unit 18. Initially, the locator unit 18 is in a watch mode. During the watch mode, the locator unit 18 monitors for incoming signals from the central station 12. Upon receipt of a signal from a subscriber or from the locator unit 18 in response to activation of the panic button 42 or non-emergency call button 44, the central station 12 sends an SMS (Short Message Service) Message to the locator unit 18 which requests that the locator unit 18 contact the central station 12. The locator unit 18 then initiates a QNC (Quick Net Connect) Internet session connecting it to the central station 12. At this time the locator unit 18 enters the Air Time mode. In air time mode, the central station 12 requests that the locator unit 18 identify its position. While the locator unit 18 is connected to the central station 12, the required information to assist the GPS device 70 in locating the satellites 14 is uploaded to the locator unit 18. The location device 18 also has the capability of obtaining the required information directly from the GPS satellites 14, but this is used only as a last alternative measure. The locator unit 18 disconnects itself from the central station 12 and starts the process of obtaining its location. The GPS 70 which is always off, is turned on and a precision time is transferred to the locator unit 18 from the PCS tower 86 along with phase-locking the GPS 70 to the PCS towers 86. The voltage information of the VCO (voltage controlled oscillator) in phase locking loop (PLL) is used as an aiding information for GPS, even when the PLL is not in locking state with the PCS tower. All the aiding information available is then delivered from the communication system to the GPS unit 70 so the locator unit 18 can use it to locate its position. After the GPS unit 70 identifies the location of the locator unit 18, the location information is transferred to the processor 54 and the GPS unit 70 is shut down. The PCS Processor initiates another QNC Internet session. During this communication the central station 12 downloads all location information from within the locator unit 18 and closes the session. The central station 12 now knows the location of the locator unit 18 and is capable of converting this data to coordinate information through the internet or regular communication schemes which average customers can comprehend. The locator unit 18 then returns to the watch mode awaiting a next signal from the control station 12. The central station 12 uses the location data received from the locator unit 18 and converts it to geographic data including landmarks, which can be delivered to the subscriber on the phone or displayed on a map for Internet users.

The locator unit 18 can be programmed to allow the wearer to initiate an emergency locate session. When the user activates the panic button 42, the locator unit 18 contacts the central station 12 indicating emergency action is required. The panic (Alert) button 42 makes the state transition from Watch Mode to Air Time Mode and an internet session is established. The central station 12 notes this emergency contact and starts the locating process as described above. The initial message from the central station 12 includes the base station identification information which is used to indicate which of the appropriate PSATs (Public Service Answering Point) to tie into the emergency session when final location information is received. If the locator unit 18 does not reply in a reasonable period of time, the PSAP is notified of the emergency request with no response. The air time mode then proceeds as discussed above.

A non-emergency situation call may also be initiated by the user upon activating the non-emergency call button 44. The process followed is similar to that when the panic button 42 is activated. When the non-emergency call button 44 is activated, the central station 12 forwards this non-emergency situation information to a contact person in a prioritized contact list. This list is preferably provided to the central station 12 during service registration and allows contacting a guardian without a PSAT 911 emergency call center involved.

The pager mode is also illustrated in FIG. 5. The locator unit 18 has the optional ability to display SMS messages on the display 36 as a pager if a subscriber elects. In such a case, the Watch mode switches to the Pager mode upon receipt of an appropriate SMS message from the central station 12. The unit has a visual note such as a musical note as well as a sonic alert to notify the wearer that a page has been received. The locator unit 18 then displays the received pager message on the display 36.

Optionally, the locator unit 18 is able to receive wired or short range wireless communications to and from a headset/microphone which is received by the headphone port 52 to facilitate cellular communications as PCS phone. Since there is no keypad, the wearer would initiate an internet session, which connects the locator unit 18 to the central station 12 computer. The central station 12 computers have voice recognition software which, when prompted, initiate a call forward to wherever the user requests. The locator unit 18 should be in the Air Time Mode during phone communication.

In order to comply with the FCC's requirement to have a cell phones turned off during air travel, the locator unit 18 is capable of being temporarily shut off by using an authorized Key Fob 46 to shut down the cellular phone circuitry for a specified period of time (from 1 to 24 hours) as set by the user. After this time expires, the locator unit 18 automatically turns on and waits to be called in low power mode. An icon indicating the locator unit 18 is in airplane mode as well as the remaining time until reactivation will be displayed. Additional time can be incremented (or set to zero) if desired through reconnecting the Key Fob.

Key Fobs 74 are used for unlocking and locking the locator unit 18 about the wrist of the user. The Key Fob also contains the battery charging circuitry which, when connected to a wall voltage through the supplied transformer, (to the same port that is used to unlock the locator unit 18), will charge the locator unit 18. Any Key Fob can charge the locator unit 18 but only an authorized Key Fob can unlock or activate the Airplane Mode. Other Key Fobs can be added to be used as authorized or unauthorized charging fobs only for use of the wearer if they are to be away for extended periods. A car battery adapter can also be used with the Key Fob to charge while traveling. Each locator unit 18 can also be programmed to allow up to a predetermined number of key fobs. A single Key Fob can open as many locator units 18 as it has been programmed with no limit. The Key Fob and transformer (battery charger) can be used as a backup method to unlock the locator unit 18 if the battery is depleted to a value too low to open the lock. Additional key fobs can be authorized to the unit via the central station 12 in an over-the-air activation process.

The display has the ability to display time, date, page number, or page data. Furthermore, various icons display status of the locator unit 18 or current mode of operations such as antenna signal strength, lock indicator, Audio mode for page alert, Airplane mode, battery charge level indicator, etc.

The locator unit 18 has tamper and cut detection circuitry 76 which activates a self initiated emergency session which detected that will indicate tampering. If the locator unit 18 is tampered with while not being worn, an alarm signal is generated as soon as it is locked on the wearer.

Ephemeris data is downloaded from the satellites 14 nationwide by the central station 12 as indicated by numeral 25 in FIG. 6 for delivery to the locator unit 18 as required. These ephemeredes are time sensitive and do change continuously. Therefore, this data needs to be constantly refreshes at the central station 12 so it is available at all times.

The locator unit's 18 CDMA processor 54 acts as a thin server to the locator unit's GPS. Due to the limited power available with the power source 56, the GPS receiver is turned off when it is not finding satellites. The GPS when turned on goes through a power up routine, and, since the crystal on the GPS is not adequately warmed up, the drift makes it unsuitable to be used to find the satellites. The system of the present invention synchronizes the frequency of the GPS with the PCS tower frequency. Even though they are different frequencies it is consistent and the phase lock frequency error can be programmed into the GPS software to achieve an accelerated frequency search algorithm. The time accuracy also requires a higher accuracy than what can be supplied in the mobile unit. The required GPS time accuracy is transferred from the PCS tower 22. This could have an error of up to 100 $\mu$sec due to the variability of distance from the PCS tower 22 and locator unit 18. The 3-sigma point is then calculated and the time error and this accuracy are used as the seed time for starting the search of the variability from the tower. Since time to first fix is of utmost importance we do not use the GPS as the primary means (backup only when not available from PCS tower) to download the ephermeris from the satellites 14. The PCS phone communications to the central station 12 includes the base station identification number (ID) associated with the location of the tower 22, allowing the central station 12 to select only those satellites 14 visible to the locator unit 18 for the next ephemeris period. The GPS also knows when an ephemeris for a particular satellite 14 is invalid and will eliminate it from its search string.

From the above description it can be seen that the personal location detection system of the present invention is able to overcome the shortcomings of prior art devices by providing a personal location detection system which is able to track a missing person in both hostile and non-hostile situations, using the Global Positioning Satellite system (GPS) to determine the location of the user with limited battery power resources. The personal location detection system includes a portable locator device including a communication device for wirelessly connecting to both a communications network and the GPS system and relaying the location determined by the GPS system to a central station via the communications network. The portable locator unit is able to generate a sonic or radio frequency beacon for aiding emergency personnel in pin pointing the location of the user, initiate an emergency call to the central station, whereby, in response to the call, the central station will contact a designated person as to the location and situation regarding the user. The portable locator unit is also able to initiate a non-emergency call to the central station, causing the central station to contact a designated person and initiate a voice call to another party via the central station using the locator unit. Furthermore, the personal location detection system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A personal locator device comprising:
   a) a portable housing able to be worn about the wrist of a user;
   b) means for establishing a wireless communication with a central station, said establishing means including a wireless transmitter and wireless receiver;
   c) means for contacting a Global Positioning Satellite system for determining a location of said locator device, wherein upon receipt of a location request signal by said wireless receiver from the central station, said locator unit activates said contacting means to contact the GPS system and calculate location data therefrom, and upon completion of the location data calculation, said wireless transmitter transmitting said location data to the central station for analysis;
   d) means for power control of GPS unit and communication transmitter to maximize battery life;
   e) said portable housing displaying a clock which is set when wireless communication is established with said central station;
   f) a key for latching the device about the wrist of the user and a latching mechanism activated by a latching command received from the central station for latching said device about the wrist of the user; and
   g) an ultrasonic beacon generator for generating a beacon signal for aiding a person in pinpointing a location of the device.

2. The device as recited in claim 1, wherein said device further includes a panic button for transmitting an emergency signal to the central station upon detection of an emergency situation by the user, the central station transmitting a location response signal back to said device in response to receipt of the emergency signal.

3. The device as recited in claim 2, wherein said device further includes a non-emergency call button for transmitting a location request signal to the central station upon activation by the user, the central station transmitting a location response signal back to said device in response to receipt of the non-emergency signal.

4. The device as recited in claim 3, wherein the central station stores a contact list for each location device, the central station informing a person on the contact list as to the location of the locator device upon receipt of the location data in response to activation of the non-emergency call button by the user.

5. The device as recited in claim 1, wherein said establishing means utilizes one of a POTS, cellular, PCS or internet communications network.

6. The device as recited in claim 5, further comprising a tamper detection sensor for detecting when said device is tampered with and activating said transmitter to transmit an emergency signal to the central station.

7. The device as recited in claim 1, further comprising a microphone for receiving audio signals from the user for transmission to another party via the central station and a speaker for reproduction of audio signals received by said receiver from the other party via the central station.

8. A method for locating a person or object, said method comprising the steps of:
   a) attaching a locator unit to the object or person to be tracked and using a key receiving a remote signal from a control station to latch a latching mechanism;
   b) upon receipt of a location request from a subscriber, transmitting a signal from said control station to the locator unit requesting a location of the locator unit;
   c) activating a GPS unit connected to the locator unit for receiving GPS satellite signals;
   d) aiding GPS signal acquisition to reduce time to first fix by use of voltage information from clock phase lock loop tracking PCS tower clock;
   e) calculating location data from the GPS signals;
   f) transmitting the location data to the central unit for analysis to determine the location of the locator unit;
   g) informing the subscriber of the location of the locator unit;
   h) generating a beacon by said locator unit for aiding the subscriber in locating the locator unit when at close range;
   i) activating the locator unit to contact the central station and initiate generation of a location request signal upon activation of a non-emergency call button on the locator unit;
   j) contacting a person identified on a contact list stored by the central station upon receipt of location data from the locator unit;
   k) activating a panic button on the locator unit to contact the central station and initiate generation of a location request signal for use by an emergency service upon activation of a panic button on the locator unit;
   l) suspending operation of the locator unit for a predetermined settable time period upon activation of an air mode button;
   m) monitoring the power level of the locator unit by the central station; and
   n) setting the time on a clock displayed on said locator unit when wireless communication is established with said central station.

* * * * *